(12) United States Patent
Yalakanti

(10) Patent No.: US 8,365,292 B2
(45) Date of Patent: *Jan. 29, 2013

(54) METHODS AND SYSTEMS FOR MANAGING A POTENTIAL SECURITY THREAT TO A NETWORK

(75) Inventor: Ramachandra Yalakanti, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,088

(22) Filed: Jan. 17, 2012

(65) Prior Publication Data
US 2012/0117654 A1    May 10, 2012

Related U.S. Application Data

(62) Division of application No. 12/244,974, filed on Oct. 3, 2008, now Pat. No. 8,122,503.

(60) Provisional application No. 61/057,842, filed on May 31, 2008.

(51) Int. Cl.
*G08B 23/00* (2006.01)

(52) U.S. Cl. .......................................................... 726/25
(58) Field of Classification Search .................. None
See application file for complete search history.

(56) References Cited

U.S. PATENT DOCUMENTS

2005/0182969 A1*  8/2005  Ginter et al. .................. 713/201

* cited by examiner

*Primary Examiner* — Brandon Hoffman

(57) ABSTRACT

Methods, systems and computer readable mediums storing computer executable programs for managing a potential security threat to a network are disclosed. Network data received at a network system within a network is monitored at a network management system. A determination is made at the network management system regarding whether the network data received at the network system poses a potential security threat to the network. A threat type associated with the potential security threat is identified at the network management system based on the determination. A threat assessment system operable to evaluate the identified threat type is identified at the network management system. A command is issued from the network management system to the network system to mirror network data received at the network system to the identified threat assessment system.

20 Claims, 3 Drawing Sheets

US 8,365,292 B2

METHODS AND SYSTEMS FOR MANAGING A POTENTIAL SECURITY THREAT TO A NETWORK

CROSS-REFERENCE TO RELATED APPLICATION

The present application is a continuation (divisional) application of Ser. No. 12/244,974, filed Oct. 3, 2008, now U.S. Pat. No. 8,122,503, issued on Feb. 12, 2012, which claims priority from provisional application Ser. No. 61/057,842, filed May 31, 2008, the contents of both of which are incorporated herein by reference in their entirety.

FIELD OF THE INVENTION

The present invention generally relates to network management and more particularly to managing a potential security threat to a network.

BACKGROUND OF THE INVENTION

Technological advances have led to the use of increasingly larger and complex networks with an ever increasing number of network systems as an integral part of organizational operations. Many network systems routinely receive, process and/or store data of a sensitive and/or confidential nature. Users are often provided with access to a network via external network access points to retrieve and/or exchange data with network systems within the network. The increased use of such external network access points has in many cases rendered networks increasingly vulnerable to attacks by malicious users.

Attacks on networks are growing in frequency and sophistication. The sensitive nature of data that is routinely stored in such networks often attracts malicious users or hackers that seek to gain access to the sensitive data and/or confidential data. In some cases, malicious users seek access to networks and network systems with the intention of corrupting the network and/or network systems. Examples of mechanisms that are often used by malicious users to inflict damage on a network include, but are not limited to, viruses, worms, spiders, crawlers and Trojans.

The increasing frequency of attacks on networks has often led to an increase on the demands made on network administrators to detect, assess and respond to detected network data anomalies in a timely manner.

SUMMARY OF THE INVENTION

One aspect of the invention is directed to a method of managing a potential security threat to a network. Network data received at a network system within a network is monitored at a network management system. A determination is made at the network management system regarding whether the network data received at the network system poses a potential security threat to the network at the network management system. A threat type associated with the potential security threat is identified at the network management system based on the determination. A threat assessment system operable to evaluate the identified threat type is identified at the network management system. A command is issued from the network management system to the network system to mirror network data received at the network system to the identified threat assessment system.

Another aspect of the invention is directed to computer readable medium for storing a computer executable program for managing a potential security threat to a network. Yet another aspect of the invention is directed to a system for managing a potential security threat to a network.

DETAILED DESCRIPTION OF THE DRAWINGS

Figure 1:
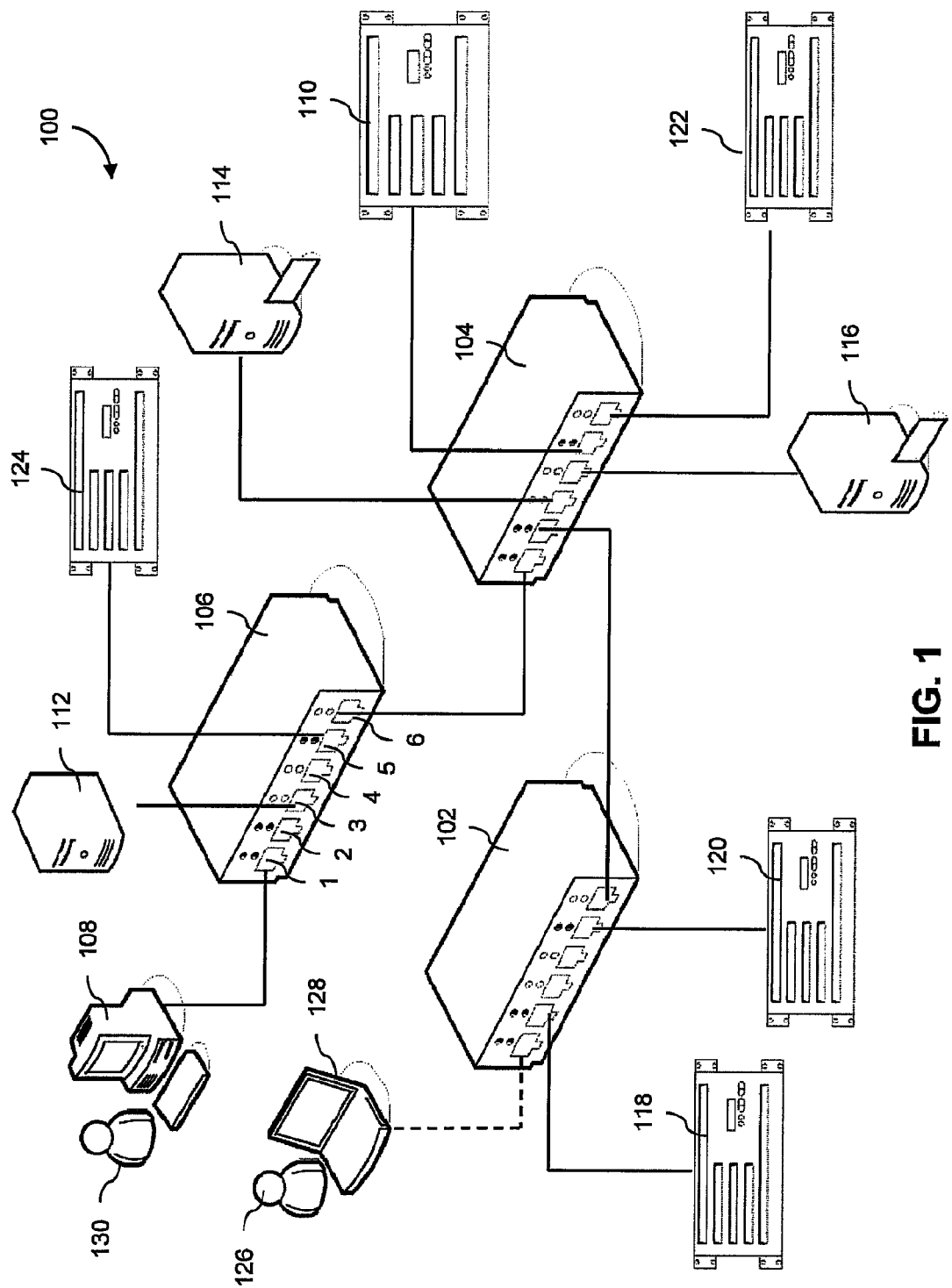
FIG. 1 is a block diagram representation of an example of a network where one embodiment of managing a potential security threat to a network may be implemented.

Referring to FIG. 1, a block diagram representation of an example of a network 100 where one embodiment of managing a potential security threat to a network 100 may be implemented is shown. The example network 100 generally includes first, second and third network switch systems 102, 104, 106, a network administrator system 108, a network management system 110, first, second and third server systems 112, 114, 116, and first, second, third and fourth threat assessment systems 118, 120, 122, 124. An external system 128, a laptop is communicatively coupling to the network 100.

The first, second and third network switch systems 102, 104, 106 are communicatively coupled to each other and generally communicative couple network systems to the network 100. Each of the first, second and third network switch systems 102, 104, 106 includes a plurality of data ports 1, 2, 3, 4, 5, 6. Communicative coupling is established between the first network switch system 102 and the second network switch system 104 via a communication channel between data port 6 of the first network switch system 102 and data port 2 of the second network switch system 104. Communicative coupling is established between the second network switch system 104 and the third network switch system 106 via a communication channel between data port 1 of the second network switch system 104 and data port 6 of the third network switch system 106.

In one embodiment, one or more network switch systems 102, 104, 106 includes one or more edge interconnect data ports. Data port 1 of the first network switch system 102 is communicatively coupled to the external system 128 and is an example of an edge interconnect data port. In one embodiment, one or more network switch systems are configured as edge interconnect network switch systems where the data ports 1, 2, 3, 4, 5, 6 are all configured as edge interconnect data ports.

In one embodiment, one or more network switch systems 102, 104, 106 include an embedded threat assessment system in the form of a switch based trap system. The switch based trap system is configured to detect one or more selected network data anomalies and raises a network data anomaly event upon detection of the one of the selected network data anomalies. In one embodiment, the switch based trap system issues an anomaly notification to the network management system 110 upon detection of one of the selected network data anomalies. In one embodiment, the switch based trap system issues an anomaly notification to the network administrator system 108 upon detection of one of the selected network data anomalies. In one embodiment, the switch based trap system is a virus throttling (VT) system.

In one embodiment, one or more data ports 1, 2, 3, 4, 5, 6 of one or more of the network switch systems 102, 104, 106 are configured as mirror source ports. In one embodiment, one or more data ports 1, 2, 3, 4, 5, 6 of one or more network switch systems 102, 104, 106 are configured as mirror destination ports. In one embodiment, one or more data ports 1, 2, 3, 4, 5, 6 of one or more network switch systems 102, 104, 106 are configured as local mirror source ports. In one embodiment, one or more data ports 1, 2, 3, 4, 5, 6 of one or more network switch systems 102, 104, 106 are configured as local mirror destination ports. In one embodiment, one or more data ports 1, 2, 3, 4, 5, 6 of one or more network switch systems 102, 104, 106 are configured as remote mirror source ports. In one embodiment, one or more data ports 1, 2, 3, 4, 5, 6 of one or more network switch systems 102, 104, 106 are configured as remote mirror destination ports.

While a network switch systems having six data ports have been described, network switch systems used in a network may have a fewer or a greater number of data ports. For example, many network switch systems have well over a 100 data ports. Also while a number of different types of network switch system having the described configurations and/or features have been described, the network switch systems may be configured using alternative network switch system configurations and/or features. Furthermore, while a network has been described as having three network switch systems, a fewer or greater number of network switch systems may be used.

Threat assessment systems 118, 120, 122, 124 generally monitor network data to identify network data anomalies that may pose a security threat to the network 100 and evaluate any identified network data anomalies. In one embodiment, a threat assessment system 118, 120, 122, 124 implements mitigation actions in response to the detection of a network data anomaly that may pose a potential security threat to the network 100. There are a number of different types of threat assessment systems 118, 120, 122, 124 available for use in networks 100. Examples of such threat assessment systems 118, 120, 122, 124, include but are not limited, to intrusion detection systems (IDS), intrusion prevention systems (IPS), unified threat management (UTM) systems and firewall (FVV) systems. In the example network 100, the first and second threat assessment systems 118, 120 are intrusion detection systems (IDS), the third threat assessment system 122 is an intrusion prevention system (IPS), and the fourth threat assessment system 124 is a unified threat management (UTM) system.

The first and second threat assessment systems 118, 120 are communicatively coupled to the network 100 via the first network switch system 102 and the third and fourth threat assessment systems 122, 124 are communicatively coupled to the network 100 via the second and third network switch systems 104, 106, respectively. More specifically, the first threat assessment system 118 is communicatively coupled to the network 100 via a communication channel between the first threat assessment system 118 and data port 2 of the first network switch system 102. The second threat assessment system 120 is communicatively coupled to the network 100 via a communication channel between the second threat assessment system 120 and data port 5 of the first network switch system 102. The third threat assessment system 122 is communicatively coupled to the network 100 via a communication channel between the third threat assessment system 122 and data port 6 of the second network switch system 104. The fourth threat assessment system 124 is communicatively coupled to the network 100 via a communication channel between the fourth threat assessment system 124 and data port 5 of the third network switch system 106.

In one embodiment, one or more threat assessment systems 118, 120, 122, 124 issues an anomaly event notification to the network administrator system 108 upon the detection of selected network data anomalies. In one embodiment, one or more threat assessment systems 118, 120, 122, 124 issues an evaluation notification to the network administrator system 108 upon completion of an evaluation of a detected network data anomaly. In one embodiment, one or more threat assessment systems 118, 120, 122, 124 issues an anomaly event notification to the network management system 110 upon the detection of a network data anomaly. In one embodiment, one or more threat assessment systems 118, 120, 122, 124 issues an evaluation notification to the network management system 110 upon completion of an evaluation of a detected network data anomaly.

While a number of different types of threat assessment systems have been described, other types of threat assessment systems may be used. Also while a network has been described as having four threat assessment systems, a fewer or greater number of threat assessment systems may be used. Furthermore, while a particular network configuration has been described for the threat assessment systems, alternative network configurations may be employed.

In one embodiment, upon the detection of selected network data anomalies by the network management system 110, the network management system 110 issues a network data anomaly assessment request to a selected threat assessment system 118, 120, 122, 124 to provide an assessment of the detected network data anomaly. In one embodiment, upon the detection of selected network data anomalies by the network management system 110, the network management system 110 issues a data mirroring command to a selected network system to mirror network data associated with the detected network data anomaly to a selected threat assessment system 118, 120, 122, 124. In one embodiment, upon the detection of selected network data anomalies by the network management system 110, the network management system 110 identifies the threat type posed by the detected network data anomaly, identifies a threat assessment system 118, 120, 122, 124 that specializes in the evaluation the identified threat type and issues a data mirroring command to a selected network system to mirror network data associated with the network data anomaly to the identified threat assessment system 118, 120, 122, 124.

The network management system 110 generally manages network operations including network security operations. In one embodiment, the network management system 110 includes a network immunity management system where the network immunity management system generally manages network security operations. In one embodiment, the network management system 110 is a network immunity management (NIM) system type of network management system that generally manages network security operations. Additional types of network management systems are used to manage other types of network operations. In one embodiment, the network management system 110 includes an embedded threat assessment system. In one embodiment, the embedded threat assessment system is a network behavior anomaly detection (NBAD) system. The network management system 110 is communicatively coupled to the network 100 via the second network switch 104. More specifically, the network management system 110 is communicatively coupled to the network 100 via a communication channel between the network management system 110 and data port 5 of the second network switch system 104. The network management system 110 will be described in greater detail with reference to FIG. 2 below.

The network administrator 130 generally manages network operations including network security operations via the network administrator system 108. The network administrator system 108 is communicatively coupled to the network 100 via the third network switch 106. More specifically, the network administrator system 108 is communicatively coupled to the network 100 via a communication channel between the network administrator system 108 and data port 1 of the third network switch system 106.

In one embodiment, the network administrator 130 is provided with the option of manually defining and/or amending security policies via the network administrator system 108. In one embodiment, anomaly notifications are received at the network administrator system 108. In one embodiment, the network administrator 130 is provided with the option of selectively manually enforcing selected security polices via the network administrator system 108. In one embodiment, the network administrator 130 is provided with the option of selectively manually implementing one or more mitigation responses to selected network data anomalies via the network administrator system 108. In one embodiment, the network administrator 130 is provided with the option of configuring selected network systems via the network administrator system 108.

In one embodiment, the network administrator 130 is provided with the option of configuring individual network switch systems 102, 104, 106 via the network administrator system 108. In one embodiment, the network administrator 130 is provided with the option of configuring individual data ports 1, 2, 3, 4, 5, 6 of individual network switch systems 102, 104, 106 via the network administrator system 108. In one embodiment, the network administrator 130 is provided with the option of configuring individual data ports 1, 2, 3, 4, 5, 6 as mirror source data ports and as mirror destination data ports via the network administrator system 108. In one embodiment, the network administrator 130 is provided with the option of configuring individual data ports 1, 2, 3, 4, 5, 6 as local mirror source data ports and as local mirror destination data ports via the network administrator system 108. In one embodiment, the network administrator 130 is provided with the option of configuring individual data ports 1, 2, 3, 4, 5, 6, as remote mirror source data ports and as remote mirror destination data ports via the network administrator system 108. While a number of different network administrations functions that may be performed by a network administrator 130 via the network administrator system 108 have been described, other network administrations functions may also be performed by a network administrator 130 via the network administrator system 108.

The first server system 112 is communicatively coupled to the network 100 via the third network switch 106 and the second and third server systems 114, 116 are communicatively coupled to the network 100 via the second network switch 104. More specifically, the first server system 112 is communicatively coupled to the network 100 via a communication channel between the first server system 112 and data port 3 of the third network switch system 106. The second server system 114 is communicatively coupled to the network 100 via a communication channel between the second server system 114 and data port 3 of the second network switch system 116. The third server system 116 is communicatively coupled to the network 100 via a communication channel between the third server system 116 and data port 4 of the second network switch system 116. In the example network 100, the first server system 112 handles data requiring a relatively low level of network security while the second and third server systems 114, 116 handle relative sensitive financial data and require a relatively higher level of network security. While one network configuration including specific types of server systems configured within the network in a particular manner have been described, other types of server systems may be used in a network. Also while one network configuration of server systems has been described alternative network configurations may be used. Furthermore while three servers have been described as a part of the network, a fewer or greater number of servers may be used.

A user 126 has used an external system 128, a laptop, to establish communicative coupling with the network 100. The external system 128 has established communicative coupling with the network 100 via a communication channel established between the external system 128 and data port 1 of the first network switch system 102. Data port 1 is an edge interconnects data port. A user as used in the description includes human users as well as automated agents. One example of such an automated agent is a bot.

In one embodiment, communication channels established between network systems within the network 100 are wireless communication channels. In one embodiment, communication channels established between network systems within the network 100 are wired communication channel. In one embodiment, communication channels established between network systems within the network 100 are a combination of wireless communication channels and wired communication channels.

In one embodiment, communication channels established between external system 128 and the network 100 are via wireless communication channels. In one embodiment, communication channels established between external system 128 and the network 100 are via wired communication channels. In one embodiment, communication channels established between external system 128 and the network 100 are via a combination of wireless communication channels and wired communication channels.

While one particular configuration of a network 100 where one embodiment of managing security in a network 100 may be implemented has been described, embodiments of managing security in a network may be implemented in networks having alternative configurations. Furthermore, embodiments of managing security in a network may be implemented in networks including a fewer or greater number of types of network systems and including a fewer or greater number of the described network systems.

Figure 2:
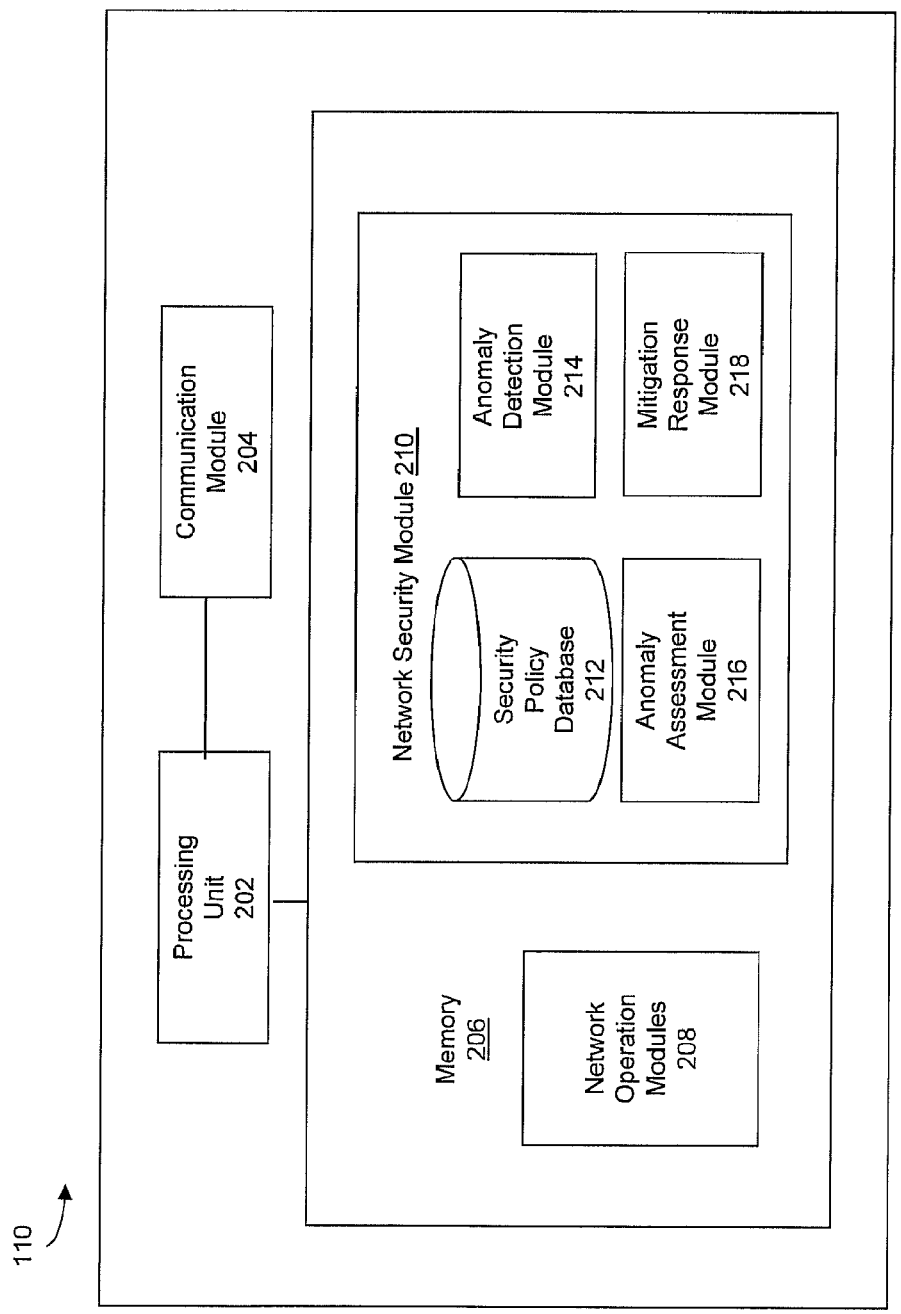
FIG. 2 is a block diagram representation of one embodiment of a network management system.

Referring to FIG. 2, a block diagram representation of one embodiment of a network management system 110 is shown. The network management system 110 generally includes a processing unit 202, a communication module 204 and a memory 206. The processing unit 202 generally includes a processor or controller. In one embodiment, the communication module 204 generally coordinates the exchange of data between the network management system 110 and other network systems. In one embodiment, the communication module 204 coordinates the exchange of data between the network management system 110 and external system 128. In one embodiment, the communication module 204 supports communication via a networking infrastructure. In one embodiment, the communication module 204 supports communication via the Internet. In one embodiment, the communication module 204 supports communication via an Intranet. In one embodiment, the communication module 204 supports wireless communication. In one embodiment, the communication module 204 supports short range wireless communication. In one embodiment, the communication module 204 supports wired communication.

In one embodiment, a network operations module 208 and a network security module 210 are stored in the memory 206. In one embodiment, a network operations module 208, a network security module 210 and network anomaly behavior detection (NBAD) module are stored in the memory 206. The NBAD system is a type of threat assessment system. The network operations module 208 generally manages network operations in the network 100. The network security module 210 generally manages network security in the network 100. More specifically, upon detection of a network data anomaly, the network security module 210 assesses the detected network data anomaly and implements a mitigation response to the detected network data anomaly based on the assessment without requiring intervention or action on the part of a network administrator 130.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

In one embodiment, the network security module 210 generally includes a security policy database 212, an anomaly detection module 214, an anomaly assessment module 216 and a mitigation response module 218. A plurality of security polices are stored in the security policy database 212. Security policies generally define mitigation responses to selected network data anomalies. Examples of network data anomalies include, but are not limited, to a network traffic anomaly and a protocol anomaly. In one embodiment, one or more of the security policies are pre-defined security polices. In one embodiment, one or more of the security polices are defined by a network administrator 130 at a network administrator system 108 and transmitted to the network management system 110 for storage in the security policy database 212.

Security policies are based on one or more different types of security parameters. In one embodiment, a security policy associated with a specific type of network data anomaly may be based on the severity of the network data anomaly. In one embodiment a security parameter is a threat type. Examples of threat types include, but are not limited to, viruses, Trojans, spiders, protocol anomalies, suspicious network data and suspicious network traffic metrics.

In one embodiment, a security parameter is a source system parameter. The source system parameter defines the source of the network data anomaly. In one embodiment, the source system parameter is defined by the media control access (MAC) address of the source system. In one embodiment the source system parameter is the specific data port that a potentially malicious user 126 has used to communicatively couple an external device 128 to the network 100. In one embodiment, the source system parameter is a user identifier, such as for example a user name used by a potentially malicious user 126 to gain access to the network 100.

In one embodiment, a security parameter is a destination system parameter. In one embodiment, a destination system parameter defines the network system that a malicious user 126 is attempting to access within the network 100. In one embodiment, the destination system parameter is the specific data port that controls the flow of network data to a destination system that a potentially malicious user 126 is attempting to access.

In one embodiment, a security parameter is a frequency of events parameter. In one embodiment an anomaly log is maintained of the detected network data anomalies at the network management system 110. In one embodiment, the frequency of a detected network data anomaly within a pre-defined period of time represents the severity of the threat that the detected network data anomaly poses to the network 100. In one embodiment, a security parameter is a number of occurrences parameter. For example, repeated attempts by a user 126 to access the network 100 or a specific network system within the network 100 may indicate that the user 126 is a potentially malicious user. In one embodiment, a security parameter is a time period parameter. For example repeated attempts by a user 126 to access the network 100 or a network system within a pre-defined time period may indicate that the user 126 is a potentially malicious user.

In one embodiment, a security parameter is an attacker severity parameter. In one embodiment, a security parameter is a signature ID parameter. In one embodiment, the security parameter is an anomaly description parameter. In one embodiment, the security parameter is a location based parameter. In one embodiment, the security parameter is a time stamp parameter. For example, selected locations that provide access points to the network may be closed during late night hours. An attempt to access the network 100 from such a location during after hours may indicate a possible security threat to the network 100. In one embodiment, the security parameter is an action type parameter.

The anomaly detection module 214 generally manages network data anomaly detection. In one embodiment the network data anomaly is a network traffic anomaly. In one embodiment, the network data anomaly is a protocol anomaly. While a number of different types of network data anomalies have been described, the anomaly detection module may be configured to detect alternative types of network data anomalies.

In one embodiment, the anomaly detection module 214 receives an anomaly event notification from a threat assessment system that a network data anomaly has been detected. In one embodiment, the anomaly event notification includes network data anomaly related network data.

In one embodiment, the threat assessment system is a network behavior anomaly detection (NBAD) system. In one embodiment, the threat assessment system is a switch based trap system. In one embodiment, the threat assessment system is a virus throttling (VT) system. In one embodiment, the threat assessment system is an intrusion detection system (IDS). In one embodiment, the threat assessment system is an intrusion prevention system (IPS). In one embodiment, the threat assessment system is a unified threat management (UTM) system. In one embodiment, the threat assessment system is a firewall (FVV) system. While a number of different types of threat assessment systems have been described, other types of threat assessment systems may also be used.

The anomaly assessment module 216 generally receives the anomaly event notification for processing. In one embodiment, the anomaly assessment module 216 assesses the severity of the network data anomaly indicated in the anomaly event notification. In one embodiment, the anomaly assessment module 216 determines whether a mitigation response is warranted depending on the assessment of the network data anomaly. In one embodiment, the anomaly assessment module 216 determines the severity of a mitigation response to a detected network data anomaly based on the assessment of the network data anomaly. In one embodiment, the anomaly assessment module 216 issues a security alert to the network administrator system 108 based on the assessment of the detected network data anomaly.

In one embodiment, the network management system 110 maintains a log of different types of network data anomaly related data associated with prior network attacks and/or attempted network attacks. Examples of network data anomaly related data include, but are not limited to, prior malicious users and/or offenders, prior victims of network attacks and/or attempted network attacks, the different network attacks, the network attack types, and the times stamps of the different network attacks. The anomaly assessment module 216 reviews the anomaly event notification in the context of network data anomaly related data stored in the log.

In one embodiment, the anomaly assessment module 216 issues a request for additional network data associated with a detected network data anomaly from selected network systems as a part of the assessment process. The anomaly assessment module 216 uses the additional network data to determine the severity of the threat posed by the network data anomaly and whether a mitigation response is warranted.

In one embodiment, the anomaly assessment module 216 issues a network data anomaly assessment request to a selected threat assessment system to provide an assessment of the detected network data anomaly. In one embodiment, the anomaly assessment module 216 selects a threat assessment system by identifying the type of threat potentially posed by the detected network data anomaly and identifying a threat assessment system that specialized in assessing the identified threat type.

In one embodiment, the anomaly assessment module 216 determines the source data port of the network data anomaly and issues a command to the source data port to operate as a mirror source data port and mirror network data received at the source data port to the selected threat assessment system to enable the selected threat assessment system to better assess the detected network anomaly. The anomaly assessment module 216 also issues a command to the destination data port, the data port that manages the flow of network traffic to the selected threat assessment system, to operate as a mirror destination data port and accept the network data mirrored by the mirror source data port.

In one embodiment, the anomaly assessment module 216 issues a network data request to a selected network system for network data associated with the detected network anomaly. In one embodiment, the anomaly assessment module 216 issues a network data request to a selected network switch system 102, 104, 106 for network data associated with the detected network anomaly. In one embodiment, the network data request is a network data polling request to a selected network system. In one embodiment, the network data request is a network data sample request to the selected network system. In one embodiment, the network data request is a network traffic metrics request from the selected network system. In one embodiment, the network data request is a request to a selected network system to monitor network data and to issue an anomaly event notification upon detection of additional network data anomalies.

If the anomaly assessment module 216 determines that a mitigation response to the detected network data anomaly is warranted, the assessment of the network data anomaly is provided to the mitigation response module 218. In one embodiment, the assessment of the network data anomaly includes an identification of the type of network data anomaly. In one embodiment, the assessment of the network data anomaly includes a classification of the type of network data anomaly. In one embodiment, the assessment of the network data anomaly includes an indication of the severity of the threat posed by the detected network data anomaly.

The mitigation response module 218 determines a mitigation response to the detected network data anomaly based on the assessment of the detected network anomaly. As mentioned previously, each of the plurality of security policies stored in the security policy database 212 defines a mitigation response to a specific network data anomaly. The mitigation response module 218 identifies a security policy from the plurality of security policies that addresses the detected network anomaly. The mitigation response module 218 implements the mitigation response detailed in the identified security policy. The mitigation response module 218 issues one or more mitigation commands to one or more selected network systems in an attempt to mitigate the threat posed by the network data anomaly to the network 100 in accordance with the identified security policy.

In one embodiment, the mitigation response module 218 issues the one or more mitigation commands to the one or more selected network systems with instructions to implement the one or more mitigation commands for a pre-defined period of time. In one embodiment, the pre-defined period of time is defined in the security policy. In one embodiment, the pre-defined period of time is defined by the severity of the threat that the detected network anomaly poses to the network 100.

In one embodiment, a mitigation command is a media access control (MAC) address lockout command where the MAC address associated with the external device 128 being used to generate the network data anomaly is denied access to the network 100. In one embodiment, a mitigation command is a MAC address filter command. The network security module 210 identifies the MAC address of the external system 128 that generated the network data anomaly and the specific data port 1 of the specific network switch system 102 that the malicious user used to access the network 100. The mitigation response module 218 issues a command to the network switch system 102 to filter out network data generated by the identified MAC address.

In one embodiment, the mitigation command is a data port shutdown command. The network security module 210 identifies the specific data port 1 of the specific network switch system 102 that the malicious user used to access the network 100 and issues a command to the network switch system 102 to shut down the identified data port 1. In one embodiment, the mitigation command is a data port rate limit command. The network security module 210 identifies the specific data port 1 of the specific network switch system 102 that the malicious user used to access the network 100 and issues a command to the network switch system 102 to limit the rate of network data flow through the identified data port 1.

In one embodiment, the mitigation command is to quarantine network data generated by a specific MAC address or a specific data port with a virtual local area network (VLAN). In one embodiment, the mitigation command is an administrator email notification command to issue a notification email to the network administrator system 108 informing the network administrator 130 about the detected network data anomaly.

In one embodiment, the mitigation command is a user identifier based lockout command. In one embodiment, the user identifier based lockout command is a username lockout command. The network security module 210 identifies the user name associated with the source of the network data anomaly and issues a command to deny network access to a user having the identified username.

As mentioned above, in one embodiment, the mitigation response defined in the identified security policy is implemented for a pre-defined period of time. In one embodiment, a re-assessment of the network data anomaly is performed after the pre-defined period of time has elapsed. A determination is made regarding whether to repeat implementation of the mitigation response again based on an analysis of the assessment.

In one embodiment, the network security module 210 manages potential security threats to the network 100 by monitoring network data and mirroring suspicious network data to a selected threat assessment system 118, 120, 122, 124 for evaluation. As mentioned previously, the network security module 210 includes an anomaly detection module 214 and an anomaly assessment module 216.

In one embodiment, the anomaly detection module 214 monitors network data received at one or more selected network systems. In one embodiment, the anomaly detection module 214 monitors network data transmitted from one or more selected network systems. In one embodiment, at least one of the selected network systems is a network switch system 102, 104, 106. In one embodiment, at least one of the selected network systems is an edge interconnect network switch system. In one embodiment, at least one of the selected network systems 102 includes an edge interconnect data port 1. In one embodiment, at least one of the selected network systems is a network system designated as sensitive network system that typically handles and/or stores data of a sensitive or confidential nature. In one embodiment, at least one of the selected network systems is a data port that is designated as a sensitive data port that manages the flow of network data to and from network systems that handle and/or stores data of a sensitive or confidential nature. In one embodiment, at least one of the selected network systems is a network system that has been designated for monitoring by a network administrator 130. In one embodiment, at least one of the selected network systems is a data port that has been designated for monitoring by a network administrator 130.

As mentioned above, the anomaly detection module 214 monitors the network data received at a selected network system. In one embodiment, the anomaly detection module 214 issues a network data request to the selected network system. In one embodiment, the network data request is a network data polling request. In other words, the anomaly detection module 214 polls the selected network system for network data. In one embodiment, the anomaly detection module 214 periodically polls the selected network system. In one embodiment, the anomaly detection module 214 polls the selected network system on an a periodic basis. In one embodiment, the network data request is a network data sampling request. In one embodiment, the network data request is a request for network traffics metrics associated with network traffic to and/or from the selected network system. In one embodiment, the network data request is an anomaly notification or anomaly event notification request from the selected network system.

The anomaly detection module 214 determines whether the monitored network data poses a threat to the network 100. In one embodiment, the NBAD system assists the anomaly detection module 214 with making the determination. If the anomaly detection module 214 determines that the monitored network data appears suspicious and/or may pose a potential threat to the network 100, the anomaly assessment module 216 further evaluates the network data that the anomaly detection module 214 has determined may pose a threat to the network 100.

The anomaly assessment module 216 identifies the potential threat posed by the network data as a specific threat type. As mentioned previously, different types of threat assessment systems 118, 120, 122, 124 may specialize in the evaluation of specific types of threats. The different types of threat assessment systems include, but are not limited to intrusion detection systems (IDS), intrusion prevention systems (IPS), unified threat management (UTM) systems and a firewall (FW) system. Once the type of threat posed by the suspicious network data has been identified, the anomaly assessment module 216 determines the type of threat assessment system available within the network 100 equipped to further evaluate the potential threat posed by the suspicious network data.

The anomaly assessment module 216 then identifies a specific threat assessment system for evaluating the potential security threat. In one embodiment, the network administrator 130 provides a pre-defined list of threat assessment systems available for use by the network management system 110. The anomaly assessment module 216 selects a threat assessment system of the desired type from the pre-defined list. The anomaly assessment module 216 identifies the source mirror data port of the suspicious network data and the destination mirror data port of the selected threat assessment system. The anomaly assessment module 216 issues a command to the source mirror data port to mirror the network data received at the source mirror data port to the destination mirror data port and another command to the destination mirror data port to accept the mirror network data from the source mirror data port.

In one embodiment, the anomaly assessment module 216 identifies the type of threat assessment system that will be used to evaluate the potential threat to the network 100 and then identifies all of the local threat assessment systems of the desired type within in the network 100. For example, referring back to FIG. 1, the example network 100 includes four threat assessment systems 118, 120, 122, 124. The first and second threat assessment systems 118, 120 are intrusion detection systems (IDS), the third threat assessment system 122 is an intrusion prevention system (IPS), and the fourth threat assessment system 124 is a unified threat management (UTM) system. If the suspicious network data originated from the external device 128 and was received at data port 1 of network switch device 102 and if the desired threat assessment system 118, 120 is an IDS system, the anomaly assessment module 216 will identify the first and second threat assessment systems 118, 120 as local threat assessment systems 118, 120. If, as in this example, the anomaly assessment module 216 identifies more than one local threat assessment system 118, 120 of the desired type, the anomaly assessment module 216 compares the identified local threat assessment systems 118, 120 to identify the threat assessment system that is relatively better equipped to receive and/or evaluate the mirrored network data.

In one embodiment, the anomaly assessment module 216 determines the port capacity for each of the identified local threat assessment systems 118, 120 and selects the local threat assessment system with sufficient port capacity to handle receipt of the mirrored network data. In one embodiment, the anomaly assessment module 216 determines the current utilization status of each of the identified local threat assessment systems 118, 120 and selects the threat assessment system with current utilization capacity to perform an evaluation of the mirrored network data.

In one embodiment, if the anomaly assessment module 216 is unable to locate a local threat assessment system of the desired type, the anomaly assessment module 216 searches the entire network 100 for all remote threat assessment systems of the desired type and mirrors the network data remotely to one of the remote threat assessment systems. Referring back to FIG. 1, if for example, the anomaly assessment module 216 determines that the type of threat assessment system equipped to evaluate the potential threat to the security of the network 100 is an IPS system, the anomaly assessment module 216 first searches for a local IPS system and is unable to find one in example network 100. The anomaly assessment module 216 then searches the entire network 100 for a remote IPS system and determines that the third threat assessment system 122 is a remote IPS system. The third threat assessment system 122 is connected to data port 6 of the second network switch system 104. The anomaly assessment module 216 issues a command to the first network switch system 102 to remotely mirror the network data from the source mirror data port 1 to the remote destination mirror port 6 of the second network switch system 104. The anomaly assessment module 216 also issues a command to the second network switch system 104 to accept the remotely mirrored network data at destination mirror data port 6 from the source mirror data port 1 of the first network switch system 102.

In one embodiment, the anomaly assessment module 216 identifies a
MAC address of the external device 128 that generated the suspicious network data. The anomaly assessment module 216 issues a command to the network switch system communicatively coupling the external device 128 to the network 100 to mirror only the network data associated with the identified MAC address from the source mirror data port to the destination mirror data port.

Referring back to the example network 100 in FIG. 1, the anomaly assessment module 216 determines that the external device 128 is communicatively coupled to the network 100 via data port 1 of the first network switch system 102. The anomaly assessment module 216 identifies the MAC address of the external device 128 and issues a command to the first network switch system 102 to mirror only the network data associated with the identified MAC address received at the source mirror data port 1 to the destination mirror data port 6 of the second network switch system 104.

Figure 3:
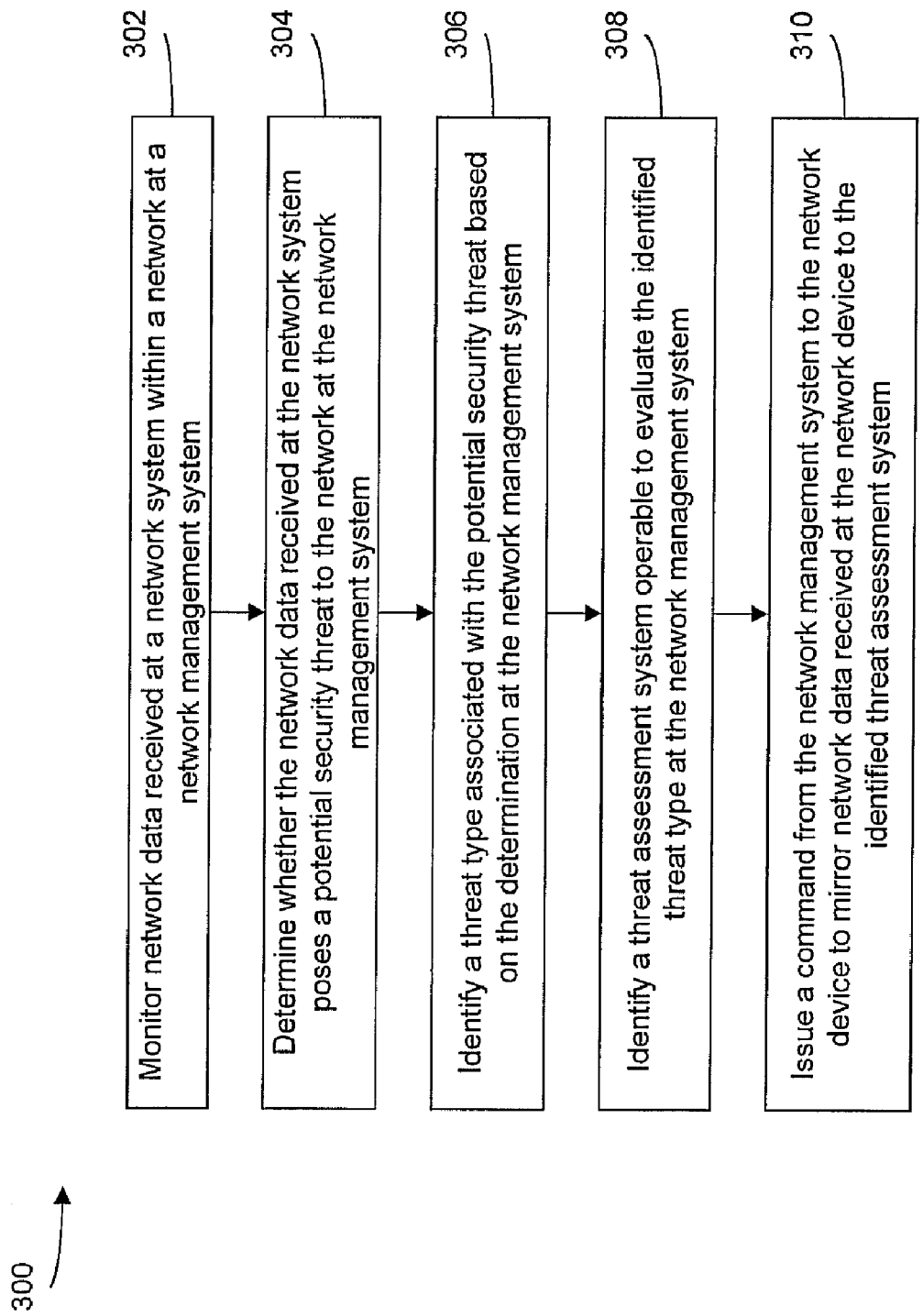
FIG. 3 is a flowchart representation of one embodiment of a method of managing a potential security threat to a network.

Referring to FIG. 3 a flowchart representation of one embodiment of a method 300 of managing a potential security threat to a network is shown. Network data received at a network system within a network 100 is monitored at a network management system 110 at step 302. A determination is made at the network management system 110 regarding whether the network data received at the network system poses a potential security threat to the network 100 at the network management system 110 at step 304. A threat type associated with the potential security threat is identified at the network management system 110 based on the determination at step 306. A threat assessment system operable to evaluate the identified threat type is identified at the network management system 110 at step 308. A command is issued from the network management system 110 to the network system to mirror network data received at the network system to the identified threat assessment system at step 310.

While the steps in the method 300 have been described in a particular order, the steps may be performed in a different order. Additional steps may be performed in addition to the described steps.

In one embodiment, a computer readable medium stores a computer executable program for managing a potential security threat to a network 100. The computer readable medium includes computer readable code for monitoring network data received at a network system within a network 100 at a network management system 110, computer readable code for determining whether the network data received at the network system poses a potential security threat to the network 100 at the network management system 110, computer readable code for identifying a threat type associated with the potential security threat based on the determination at the network management system 110, computer readable code for identifying a threat assessment system operable to evaluate the identified threat type at the network management system 110, and computer readable code for issuing a command from the network management system 110 to the network system to mirror network data received at the network system to the identified threat assessment system.

In one embodiment, a system for managing a potential security threat to a network 100 includes means for monitoring network data received at a network system within a network 100 at a network management system 110, means for determining whether the network data received at the network system poses a potential security threat to the network 100 at the network management system 110, means for identifying a threat type associated with the potential security threat based on the determination at the network management system 110, means for identifying a threat assessment system operable to evaluate the identified threat type at the network management system 110, and means for issuing a command from the network management system 110 to the network system to mirror network data received at the network system to the identified threat assessment system.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A network management system comprising:
a memory storing machine readable instructions to:
determine whether network data received at a network system poses a potential security threat to the network;
identify a threat type associated with the potential security threat based on the determination;
identify a threat assessment system of a plurality of threat assessment systems to evaluate the identified threat type; and
cause the identified threat assessment system to process the network data; and
a processing unit to implement the machine readable instructions.

2. The network management system of claim 1, wherein the machine readable instructions further comprise instructions to issue a command to the network system to mirror network data received at the network system to the identified threat assessment system to cause the identified thread assessment system to process the network data.

3. The network management system of claim 2, further comprising: machine readable instructions to identify a media access control (MAC) address associated with the network data and wherein the machine readable instructions to issue a command to the network system to mirror network data received at the network system to the identified threat assessment system comprises machine readable instructions to issue a command to the network system to mirror network data received at the network system associated with the identified MAC address to the identified threat assessment system.

4. The network management system of claim 1, wherein the machine readable instructions further comprise instructions to issue a network data request to the network system, the network data request being selected from a group consisting of a network data polling request, a network data sampling request, a network traffic metrics request and an anomaly event notification request.

5. The network management system of claim 1, wherein the machine readable instructions further comprise instructions to monitor network data received at a network system selected from a group consisting of a network switch system, an edge interconnect network switch system, an edge interconnect data port, a network system designated as sensitive, a data port designated as sensitive, an administrator designated network system and an administrator designated data port.

6. The network management system of claim 1, wherein the plurality of threat assessment systems is selected from a group consisting of an intrusion detection system (IDS) an intrusion prevention system (IPS) a unified threat management (UTM) system and a firewall (FW) system.

7. The network management system of claim 1, wherein the plurality of threat assessment systems is identified from a pre-defined list of threat assessment systems to evaluate the identified threat type.

8. The network management system of claim 1, wherein the machine readable instructions to identify a threat assessment system to evaluate the identified threat type comprises: machine readable instructions to evaluate the plurality of threat assessment systems to identify the identified threat type; determine a port capacity for each of the plurality of threat assessment systems; and select a threat assessment system with an associated port capacity to support receipt of mirrored network data from the network system based on the determination.

9. The network management system of claim 1, wherein the machine readable instructions to identify a threat assessment system to evaluate the identified threat type comprises: machine readable instructions to evaluate the plurality of threat assessment systems to evaluate the identified threat type; determine a utilization status for each of the plurality of threat assessment systems; and select a threat assessment system with an associated utilization status that is to support evaluation of mirrored network data from the network system based on the determination.

10. The network management system of claim 1, wherein the machine readable instructions to identify a threat assessment system to evaluate the identified threat type comprises: machine readable instructions to identify at least one local threat assessment system to evaluate the identified threat type; select one of the at least one local threat assessment systems; and locally mirror network data from the network system to the selected one of the at least one local threat assessment systems.

11. The network management system of claim 1, wherein the machine readable instructions to identify a threat assessment system to evaluate the identified threat type comprises: machine readable instructions to determine whether at least one local threat assessment system to evaluate the identified threat type is available; identify a remote threat assessment system to evaluate the identified threat type based on the determination; and remotely mirror the network data from the network system to the remote threat assessment system.

12. A non-transitory computer readable storage medium on which is stored a set of machine readable instructions that when executed by a processing unit, implement a method for managing a potential security threat to a network, said machine readable instructions comprising code to:
determine whether network data received at a network system poses a potential security threat to the network;
identify a threat type associated with the potential security threat based on the determination;
identify a threat assessment system of a plurality of threat assessment systems to evaluate the identified threat type; and
cause the identified threat assessment system to process the network data.

13. The non-transitory computer readable storage medium according to claim 12, wherein the machine readable instructions further comprise code to:

issue a command to the network system to mirror network data received at the network system to the identified threat assessment system to cause the identified thread assessment system to process the network data.

14. The non-transitory computer readable storage medium according to claim 12, wherein the machine readable instructions further comprise code to:
identify a media access control (MAC) address associated with the network data; and
issue a command to the network system to mirror network data received at the network system associated with the identified MAC address to the identified threat assessment system.

15. The non-transitory computer readable storage medium according to claim 12, wherein the machine readable instructions further comprise code to:
identify a threat assessment system selected from a group consisting of an intrusion detection system (IDS) an intrusion prevention system (IPS) a unified threat management (UTM) system and a firewall (FW) system.

16. The non-transitory computer readable storage medium according to claim 12, wherein the machine readable instructions further comprise code to:
identify a threat assessment system from a pre-defined list of threat assessment systems to evaluate the identified threat type.

17. The non-transitory computer readable storage medium according to claim 12, wherein the machine readable instructions further comprise code to:
evaluate the plurality of threat assessment systems to identify the identified threat type;
determine a port capacity for each of the plurality of threat assessment systems; and
select a threat assessment system with an associated port capacity to support receipt of mirrored network data from the network system based on the determination.

18. The non-transitory computer readable storage medium according to claim 12, wherein the machine readable instructions further comprise code to:
evaluate the plurality of threat assessment systems to evaluate the identified threat type;
determine a utilization status for each of the plurality of threat assessment systems; and
select a threat assessment system with an associated utilization status that is to support evaluation of mirrored network data from the network system based on the determination.

19. The non-transitory computer readable storage medium according to claim 12, wherein the machine readable instructions further comprise code to:
identify at least one local threat assessment system to evaluate the identified threat type;
select one of the at least one local threat assessment systems; and
locally mirror network data from the network system to the selected one of the at least one local threat assessment systems.

20. The non-transitory computer readable storage medium according to claim 12, wherein the machine readable instructions further comprise code to:
determine whether at least one local threat assessment system to evaluate the identified threat type is available;
identify a remote threat assessment system to evaluate the identified threat type based on the determination; and
remotely mirror the network data from the network system to the remote threat assessment system.

* * * * *